United States Patent
Matas et al.

(10) Patent No.: US 7,284,524 B2
(45) Date of Patent: Oct. 23, 2007

(54) CYLINDER HEAD ASSEMBLIES

(75) Inventors: Scott Matas, Williamsport, PA (US); Tim Mooney, Castanea, PA (US); Mike Sitar, Marshall, MI (US)

(73) Assignee: Lycoming Engines, a division of Avco Corporation, Williamsport, PA (US)

( * ) Notice: Subject to any disclaimer, the term of this patent is extended or adjusted under 35 U.S.C. 154(b) by 0 days.

(21) Appl. No.: 11/065,346

(22) Filed: Feb. 25, 2005

(65) Prior Publication Data

US 2006/0191507 A1 Aug. 31, 2006

(51) Int. Cl.
*F02B 23/08* (2006.01)

(52) U.S. Cl. ............................ 123/193.5; 123/193.6

(58) Field of Classification Search .............. 123/661, 123/193.5, 193.6
See application file for complete search history.

(56) References Cited

U.S. PATENT DOCUMENTS

| | | | |
|---|---|---|---|
| 2,041,074 A | 5/1936 | La Brie | |
| 2,749,900 A | 6/1956 | Mitchell | |
| 3,150,654 A | 9/1964 | Robison | |
| 3,965,872 A * | 6/1976 | Taira et al. | 123/269 |
| 3,999,532 A | 12/1976 | Kornhauser | |
| 4,296,720 A | 10/1981 | Nakanishi et al. | |
| 4,300,498 A | 11/1981 | May | |
| 4,421,081 A | 12/1983 | Nakamura et al. | |
| 4,445,467 A | 5/1984 | Westerman et al. | |
| 4,467,752 A * | 8/1984 | Yunick | 123/193.6 |
| 4,572,123 A | 2/1986 | Evans | |
| 4,594,976 A | 6/1986 | Gonzalez | |
| 4,610,226 A * | 9/1986 | Okuma | 123/143 A |
| 4,635,591 A | 1/1987 | Hledin | |
| 4,671,228 A | 6/1987 | Tomita et al. | |
| 4,686,948 A | 8/1987 | Smith, Jr. et al. | |
| 4,742,804 A | 5/1988 | Suzuki et al. | |
| 4,765,293 A | 8/1988 | Gonzalez | |
| 4,773,382 A | 9/1988 | Smith, Jr. et al. | |
| 4,798,183 A | 1/1989 | Hataura et al. | |
| 4,844,025 A | 7/1989 | Sheaffer | |
| 4,919,092 A | 4/1990 | Smith, Jr. et al. | |
| 4,951,642 A * | 8/1990 | Hashimoto et al. | 123/657 |
| 5,076,224 A | 12/1991 | Smith, Jr. et al. | |
| 5,138,990 A | 8/1992 | Smith, Jr. et al. | |
| 5,257,612 A | 11/1993 | Smith, Jr. et al. | |

(Continued)

OTHER PUBLICATIONS

Grabowski, George, "Blowing it Wide Open," http://www.hpt-sport.com/blowopen.htm, pp. 1-5.
Rohrich, Rich, "Fuel for Thought," http://www.eric-gorr.com/tech/Fuel_Basics.htm, pp. 1-7.

(Continued)

*Primary Examiner*—Marguerite McMahon
(74) *Attorney, Agent, or Firm*—Greenberg Traurig, LLC

(57) ABSTRACT

Cylinder head assemblies including a cylinder head and a piston are disclosed. The cylinder head includes: a recessed valve region including a first and second bulbous portion connected by a waist, the first bulbous portion accommodating an intake valve and the second bulbous portion accommodating an exhaust valve; an intake port passageway having a gradually contoured flowpath between an intake port and the intake valve in the valve region; and an exhaust port passageway having a gradually contoured flowpath between an exhaust port and the exhaust valve in the valve region. The piston includes a recessed region that substantially conforms to the recessed valve region of the cylinder head. Related overhaul kits and methods of making improved cylinder head assemblies are further disclosed.

2 Claims, 10 Drawing Sheets

U.S. PATENT DOCUMENTS

| | | | |
|---|---|---|---|
| 5,303,546 A | 4/1994 | Farrell | |
| 5,320,075 A | 6/1994 | Regueiro | |
| 5,390,634 A * | 2/1995 | Walters et al. | 123/193.5 |
| 5,421,301 A | 6/1995 | Feuling | |
| 5,501,191 A | 3/1996 | Feuling | |
| 5,598,820 A * | 2/1997 | Sokoloski | 123/306 |
| 5,671,709 A * | 9/1997 | Sokoloski | 123/193.5 |
| 5,813,385 A | 9/1998 | Yamauchi et al. | |
| 5,873,341 A * | 2/1999 | Smith et al. | 123/193.5 |
| 5,893,348 A | 4/1999 | Feuling | |
| 6,055,884 A | 5/2000 | Lantz et al. | |
| 6,135,541 A | 10/2000 | Geise et al. | |
| 6,199,544 B1 | 3/2001 | Feuling | |
| 6,209,512 B1 | 4/2001 | Castiglioni | |
| 6,832,589 B2 * | 12/2004 | Kremer et al. | 123/193.6 |

OTHER PUBLICATIONS

Tuluie, Dr. Robin, Ph.D., "Wrenching with Rob—Chemical Soup: The Mystery of Detonation," http://www.motorcycle.com/mo/mcrob/rt-fuel2.html, pp. 1-6.

* cited by examiner

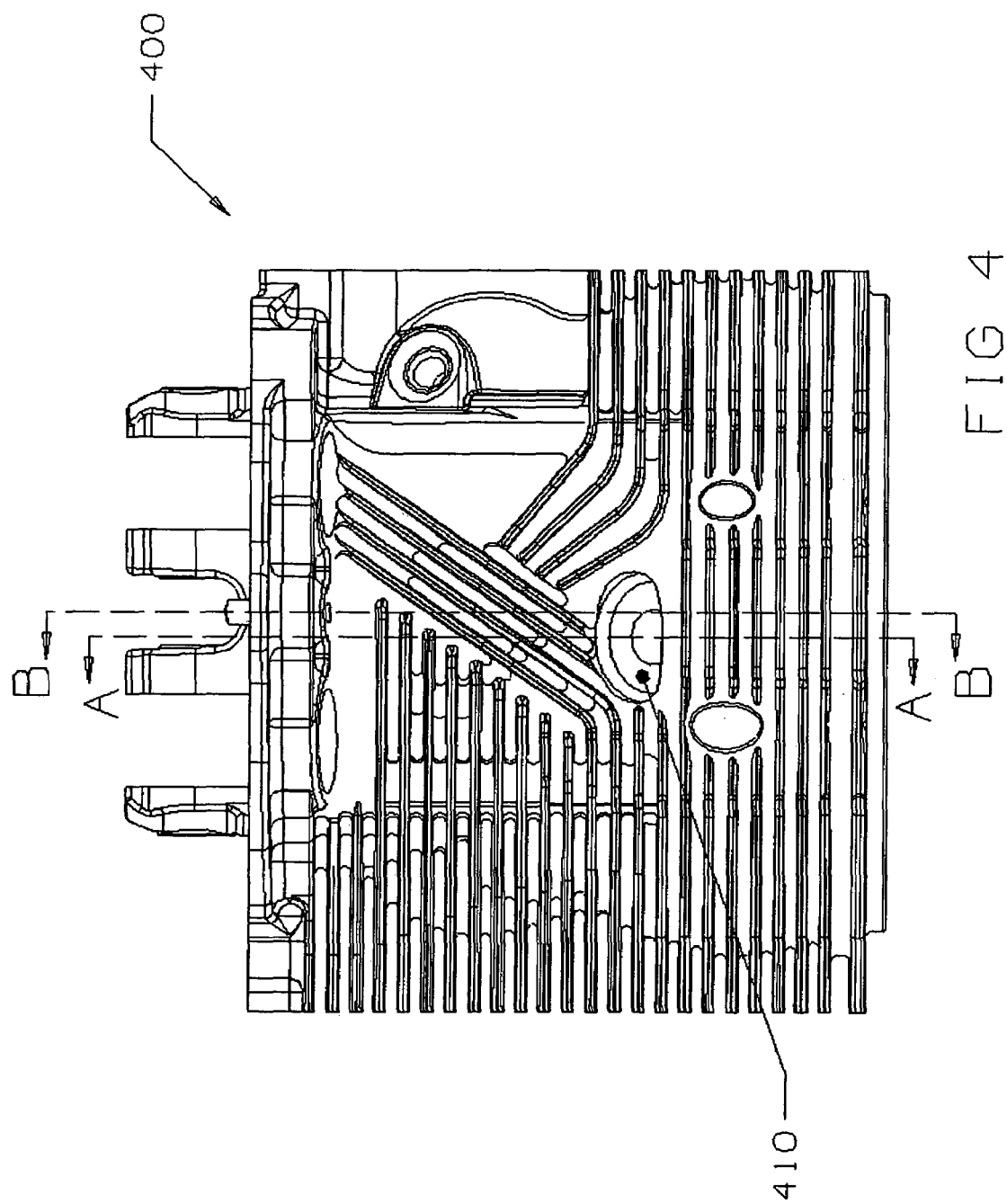

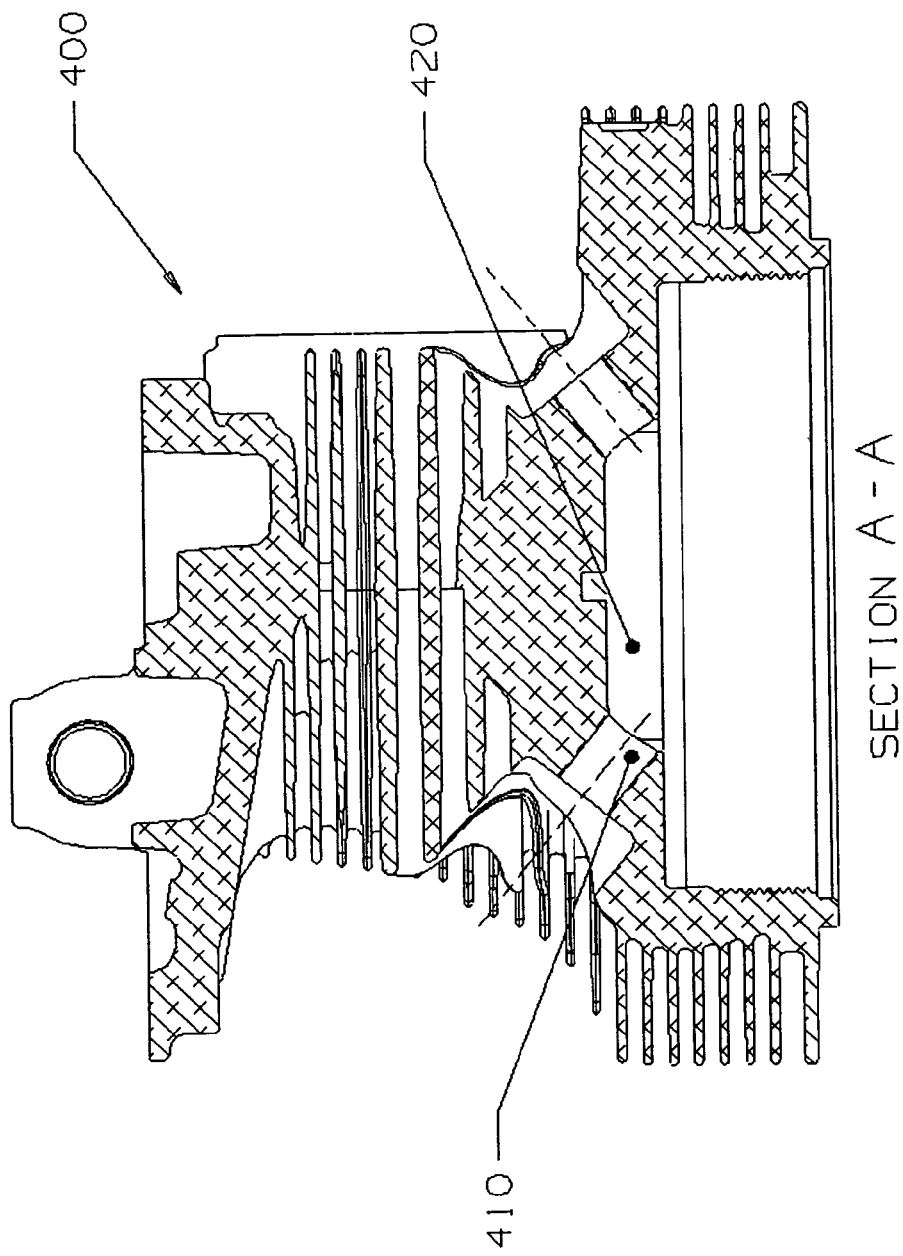
FIG 4A   SECTION A-A

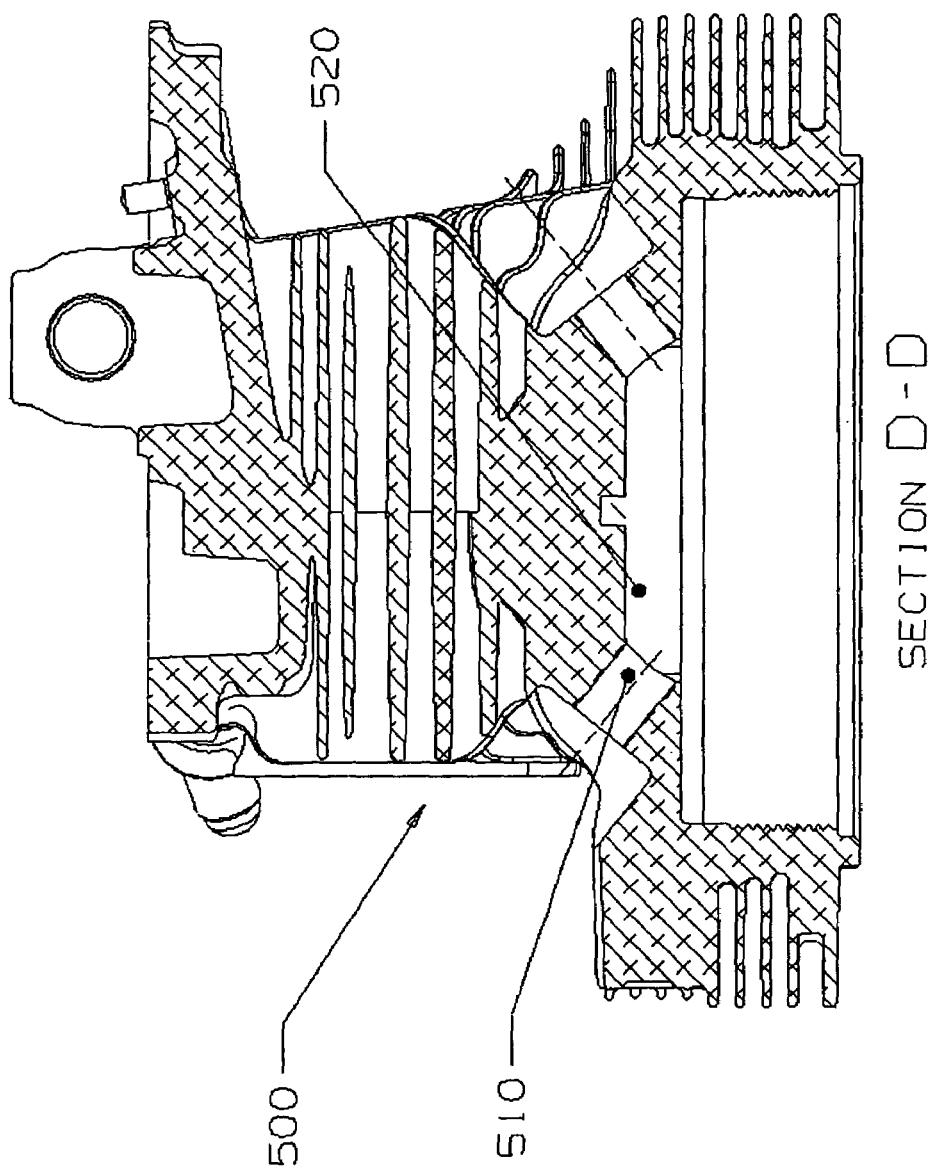
FIG 5A  SECTION D-D

CYLINDER HEAD ASSEMBLIES

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates generally to internal combustion engines and, more specifically, to reciprocating internal combustion engines used to power aircraft.

BACKGROUND OF THE INVENTION

There is continuous demand for higher efficiency and higher horsepower in aircraft internal combustion engines. Making an engine more efficient or more powerful is an exercise in compromise because a number of competing variables affect the performance of an engine.

For example, the efficiency and power output of a spark-ignited internal combustion engine are directly affected by both the timing of the spark and the compression characteristics in the combustion chamber. A poorly designed cylinder head may impede intake and exhaust gases from flowing optimally through the cylinder head, thereby causing flow losses and/or backpressure within the cylinder head and exhaust manifold. These variables, among others, can contribute to or denigrate the overall horsepower and efficiency of a spark-ignited internal combustion engine.

Conventional techniques for improving combustion in a cylinder head, and ultimately efficiency and horsepower output of the engine, include increasing temperature, pressure, and chemical residence time of the unburned fuel/air mixture, i.e., end gas. But these techniques often result in increasing the likelihood of engine knock, which may significantly degrade overall engine performance. Knock is the sound associated with a high-pressure wave front slamming against the internal surfaces of a combustion chamber in a spark-ignited internal combustion engine. The high-pressure wave results from unintended instantaneous ignition and combustion, i.e., autoignition, of the fuel/air mixture in advance of a spark. If autoignition occurs before the piston reaches top dead center ("TDC"), the pressure wave will actually push against the piston during the compression stroke thereby reducing the available energy for the power stroke, and ultimately, reduce engine power. Other conventional techniques to improve the efficiency and thoroughness of combustion in a cylinder head, such as increasing the compression ratio, off-center spark plug placement, and incorporation of slow-burn combustion chambers, can also lead to an increased likelihood of undesirable engine knock.

A faster-burning chamber can be useful in providing greater fuel efficiency as well as reducing engine knock. Characteristics of conventional faster burning chambers include the use of high-swirl intake ports and a rotational motion, i.e., swirl, of the charge due to off-cylinder-axis admission and the use of two or more spark plugs. The faster burning chambers induce small scale turbulence in the combustion chamber so that part of the piston head comes close to the cylinder head at TDC to thereby "squish" the charge in this region into a smaller, more highly compressed area of the combustion chamber and toward the spark plug tips. However, a faster burning chamber can impede the operation of other elements of the cylinder head.

One conventional method for producing a faster burning chamber is increasing the fuel/air mixture ratio, i.e., fuel enrichment, above the stoichiometric requirements for combustion. While fuel enrichment provides a cooler running engine in that expansion or evaporation of excess fuel absorbs energy, fuel economy will suffer.

Another aspect of conventional cylinder heads that contribute to reduced efficiency and power output of a spark-ignited internal combustion engine is the method of airflow into, and out of, the cylinder head. Optimal air intake and exhaust gas flow into and out of a cylinder head depends, among other things, on whether the intake and/or exhaust ports are sized correctly. If either the intake or exhaust ports are not sized to accommodate the flow rates demanded by the engine, restricted airflow and decreased efficiency and power output of the engine will result. In a conventional cylinder head, the intake and exhaust ports are typically designed to be wide and circular in shape. One conventional technique to decrease the possibility of any unintended flow resistance is to increase the size of the circular intake and/or exhaust port. However, enlargement of intake and exhaust ports are not without cost or impact on performance.

SUMMARY OF THE INVENTION

Accordingly, the present invention is directed to an improved cylinder head assembly that substantially obviates one or more of the problems due to limitations and disadvantages of the related art. An improved cylinder head assembly is provided that yields a more fuel efficient and/or increased horsepower engine. It is desired to have a new cylinder head assembly having the features of the present invention set forth below. It is also desired to have an overhaul kit that can adapt existing FAA-certified engines while maintaining certified status, or to have kits for experimental engines that include the features and efficiencies of the present invention.

Additional features and advantages of the invention will be set forth in the description which follows, and in part will be apparent from the description, or may be learned by practice of the invention. Various of the the advantages of the invention will be realized and attained by the structure particularly pointed out in the written description and claims hereof as well as the appended drawings.

The present invention involves a combination of features that can contribute both to improved fuel efficiency and increased horsepower of a spark-ignited internal combustion engine. In a first embodiment of the present invention, a new original equipment manufacturer ("OEM") engine with these features can improve efficiency or horsepower, e.g., by 10 percent, compared to conventional configurations. In a second embodiment of the present invention, an overhaul kit is disclosed to retrofit cylinder assemblies with these new features to achieve greater combustion efficiency and fuel savings while maintaining the safety and reliability of a certified engine. FAA regulations preclude certain increases in power on prior-rated systems. Therefore, while one type of overhaul kit for certified engines preferably addresses fuel efficiency in certified engines while maintaining certified status, the invention can also be conformed to an embodiment which increases power and performance in uncertified experimental engines.

The combination of several features as disclosed below produces a desirable result that can be used to boost power and improve efficiency as compared to engines having conventionally equipped cylinder head assemblies. A first feature of the present invention is an improved "squish" area that surrounds a valve region having a substantially "peanut-like" shape. The valve region may include first and second bulbous portions joined by a connecting region, or "waist." The squish area and valve region may be formed by any suitable method, e.g., machining, into a relatively flat cylinder head. The squish area substantially surrounds the valve region and extends substantially around the perimeter of the piston crown. The result is the majority of combustion takes place in the relatively small area of the valve region within the combustion chamber.

A second feature of the present invention may include positioning two spark plugs at opposing sides of the waist of the valve region such that sparking is initiated in opposing directions within the peanut-shaped area of the combustion area. The positioning of the spark plugs encourages a short burn distance and rapid advancement of the flame front from opposite sides of the peanut-shaped combustion chamber.

A third feature of the present invention is modified intake and exhaust ports having improved airflow. Lowering the squish zone, compared to a conventional engine, slightly (e.g., a quarter inch) within the cylinder head structure lengthens the intake and exhaust ports, which increases the flow radius, permitting a more gradual sweep of the flowpaths within the ports. The sweeping flowpaths permit a greater volume of air to enter the intake valve without negatively impacting flow velocity or causing an adverse pressure as compared to the relatively "sharp" angles of conventional configurations.

In one embodiment, the intake port has been reconfigured as a "low-swirl" port to balance flow around the valve head. Conventional practice provides a port that biases flow to one side of the valve head producing a swirling motion in the mixture as it enters the combustion chamber. With a low-swirl port the mixture enters the combustion chamber evenly around the valve head reducing the rotational motion of the mixture in the cylinder.

In addition, an exhaust port that has been narrowed and reconfigured to provide an almost flat-bottomed "squat" passage in association with the improvements of the present invention has been found to further enhance performance. In essence, the floor of a conventional port is flattened, bulging the sides but narrowing the overall diameter of the passage. What had been an open space where exhaust would spin in turbulence has been made solid. The opportunity for this turbulence to form has been eliminated, and the gently sweeping curves now permit a more rapid exit of exhaust gas with relatively small residence time in the exhaust port and little transfer of energy from turbulence in the passage way. This passage would instinctively appear to let less gas through than a larger, more open port. However, it has been found that this flowpath shape actually improves the flow of the exhaust gas without having to increase the port's cross-sectional area.

In one embodiment, a cylinder head assembly comprises a cylinder head and a piston. The cylinder head comprises: a recessed valve region comprising first and second bulbous portions, the first bulbous portion accommodating an intake valve and the second bulbous portion accommodating an exhaust valve; an intake port passageway having a gradually contoured flowpath between an intake port and the intake valve in the valve region; and an exhaust port passageway having a gradually contoured flowpath between an exhaust port and the exhaust valve in the valve region. The piston comprises a recessed region that substantially conforms to the recessed valve region of the cylinder head. In one aspect, the first and second bulbous portions may form a combustion chamber having a substantially peanut-like shape.

In one aspect, the cylinder head assembly further comprises a first flat region on the cylinder head substantially surrounding the valve region, and may further comprise a second flat region on the piston substantially surrounding the recessed region. The first and second flat regions may substantially align in the cylinder head to form a squish region. The first flat region may extend substantially around the perimeter of the valve region, and the second flat region may extend substantially around the perimeter of the recessed region.

In one aspect, the cylinder head assembly further comprises a first spark hole for positioning a first spark plug tip within the combustion chamber and a second spark plug hole for positioning a second spark plug tip within the combustion chamber. The first and second spark plug holes may be threaded, and may be opposed to one another across a central axis, or waist, of the valve region.

In one aspect, the exhaust port has an upper portion and a lower portion, the upper portion having a substantially circular shape and the lower portion having a substantially oblong shape.

In another embodiment, an overhaul kit for an aircraft engine cylinder head comprises a cylinder head and a piston. The cylinder head comprises: a recessed valve region comprising a first and second bulbous portion, the first bulbous portion accommodating an intake valve and the second bulbous portion accommodating an exhaust valve; an intake port passageway having a gradually contoured flowpath between an intake port and the intake valve in the valve region; and an exhaust port passageway having a gradually contoured flowpath between an exhaust port and the exhaust valve in the valve region. The piston comprises a recessed region that substantially conforms to the valve region of the cylinder head. In one aspect, the first and second bulbous portions may form a combustion chamber having a substantially peanut-like shape. The overhaul kit may be used to overhaul an FAA certified engine, in certain embodiments.

In one aspect, the overhaul kit further comprises a first flat region on the cylinder head substantially surrounding the valve region, and may further comprise a second flat region on the piston substantially surrounding the recessed region. The first and second flat regions may substantially align in the cylinder head to form a squish region. The first flat region may extend substantially around the perimeter of the valve region, and the second flat region may extend substantially around the perimeter of the recessed region.

In one aspect, the overhaul kit further comprises a first spark hole for positioning a first spark plug tip within the combustion chamber and a second spark plug hole for positioning a second spark plug tip within the combustion chamber. The first and second spark plug holes may be threaded, and may be opposed, e.g., across a central axis, or waist, of the valve region. In one aspect, the exhaust port has an upper portion and a lower portion, the upper portion having a substantially circular shape and the lower portion having a substantially oblong shape.

In another embodiment, a method of making an improved cylinder head for a piston engine comprises: forming a squish area in a cylinder head; forming a combustion chamber having substantially peanut-shaped recess in the cylinder head; directing a first spark plug at an intake valve; directing a second spark plug at an exhaust valve; providing substantially smooth and gradually contoured intake and exhaust port passageways; and forming an exhaust port having a substantially flattened floor in the cylinder head. In one aspect, the method further comprises extending the squish area substantially around the perimeter of a piston crown. In one aspect, the method further comprises positioning the first spark plug on an opposing side of the substantially peanut-shaped recess from the second spark plug. In one aspect, the method further comprises lowering the combustion chamber to provide longer intake and exhaust port passageways. The piston engine may be an FAA certified engine or an experimental engine. In one aspect, the method may include forming a substantially peanut-shaped recessed region in a piston crown. In one aspect, the method further comprises forming the exhaust port to have an upper portion having a substantially circular shape and a lower portion having a substantially oblong shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings:

FIG. 4 is a side view of a cylinder head according to an embodiment of the present invention.

FIG. 4a is a cross sectional view through the axis A-A of a cylinder head according to an embodiment of the present invention.

FIG. 5a is a cross sectional view through the axis D-D of a cylinder head according to an embodiment of the present invention.

DETAILED DESCRIPTION OF THE PREFERRED EMBODIMENT

Reference will now be made in detail to the preferred embodiments of the present invention, examples of which are illustrated in the accompanying drawings.

The present invention is directed to an improved cylinder head assembly for an aircraft engine. It will be appreciated by those skilled in the art that the cylinder head assembly described and shown herein is a representation of a single cylinder assembly in a multi-cylinder, internal combustion engine. However, the internal combustion engine may comprise any cylinder configuration.

The internal combustion engine cylinder assembly of the present invention comprises, among other components, a cylinder barrel, a cylinder head, and a piston. Generally, the cylinder head and the piston, which includes a piston crown, cooperate during operation of the engine to focus the fuel charge, i.e., air/fuel mixture, into a combustion chamber, which is defined by the special configuration of the cylinder head and the piston crown.

The present invention provides embodiments directed to improved cylinder head assemblies and associated methods. A first embodiment provides a new cylinder head assembly for an internal combustion engine. A second embodiment provides an overhaul kit for retrofitting an existing cylinder head assembly with the configurations of the present invention. A third embodiment provides a method of making an improved cylinder head assembly. The new cylinder head assembly and the overhaul kit of the present invention provide a spark-ignited internal combustion engine with greater fuel efficiency, reduced fuel octane requirement, and/or horsepower due to the combination of the following features.

Figure 1:
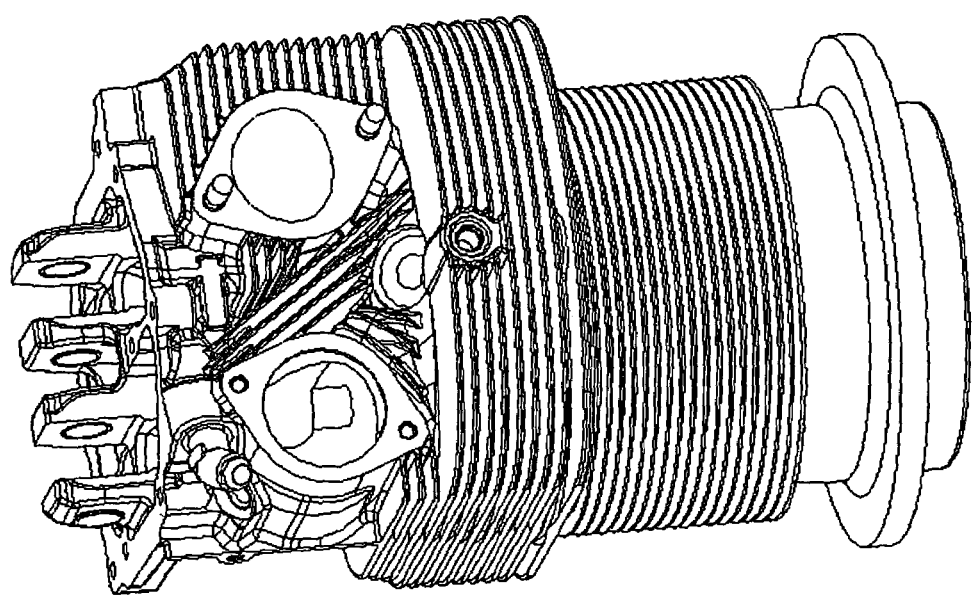
FIG. 1 is a cylinder head according to an embodiment of the present invention.

Referring to FIG. 1, a cylinder head 100 having the improved features of the present invention is shown. The features include, but are not limited to, an improved squish area, relocated spark plugs, and improved intake and exhaust flow.

Figure 1A:
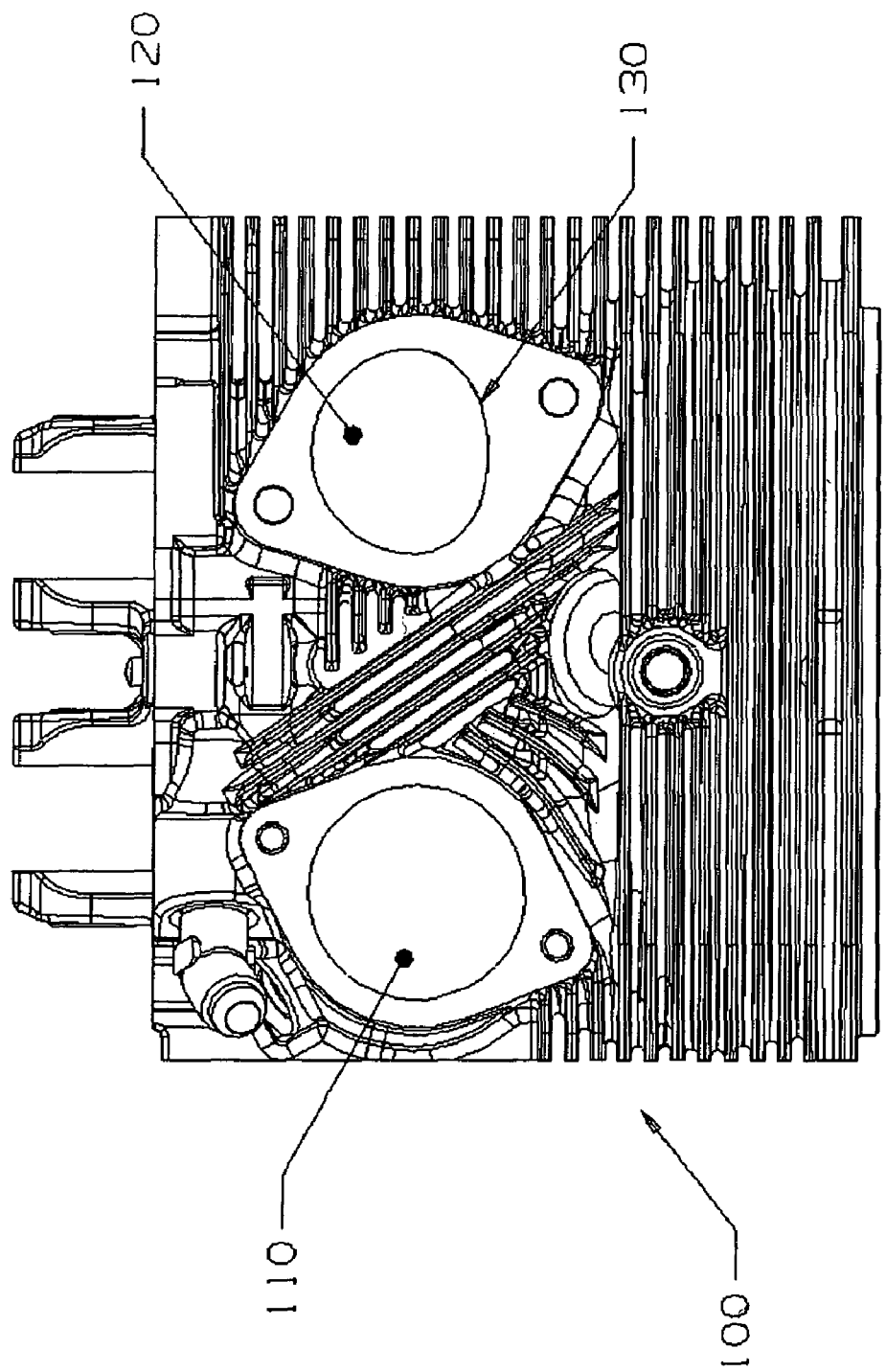
FIG. 1a is an exploded view of a cylinder head according to an embodiment of the present invention.

Referring to FIG. 1a, an exploded view of the cylinder head in FIG. 1 is shown having an intake port 110 and an exhaust port 120. Exhaust port 120 has also been further reconfigured to increase engine power by improving gas flow exiting the combustion chamber. Although there is a tremendous amount of pressure, exhaust port 120 has a smaller cross sectional area than intake port 110. Rather than increase the size of a circular exhaust port to account for the pressure, exhaust port 120 has been narrowed and reconfigured to provide a flat-bottomed "squat" passage. In essence, a floor 130 is less curved than a conventional exhaust port, narrowing the opening of the passage. The configuration of exhaust port 120 eliminates the open space at the bottom of a conventional exhaust port where exhaust would create turbulence. Eliminating the opportunity for this turbulence to form and providing sweeping passageways permits a rapid exit of gas with relatively little loss of energy due to turbulence in the passage way. By changing the shape of exhaust port 120, the flow is less restricted and compensates for back pressure. As a result, the improved configuration of the exhaust port provides an increased mass flow out of the combustion chamber. The rapid evacuation and throughput of gases produces higher horsepower and efficiency of a spark-ignited internal combustion engine having the improvements of the present invention. This feature (e.g., providing a flat-bottomed "squat" passage) may also be applied in addition or alternatively to the intake port 110.

Squish Area

Figure 2:
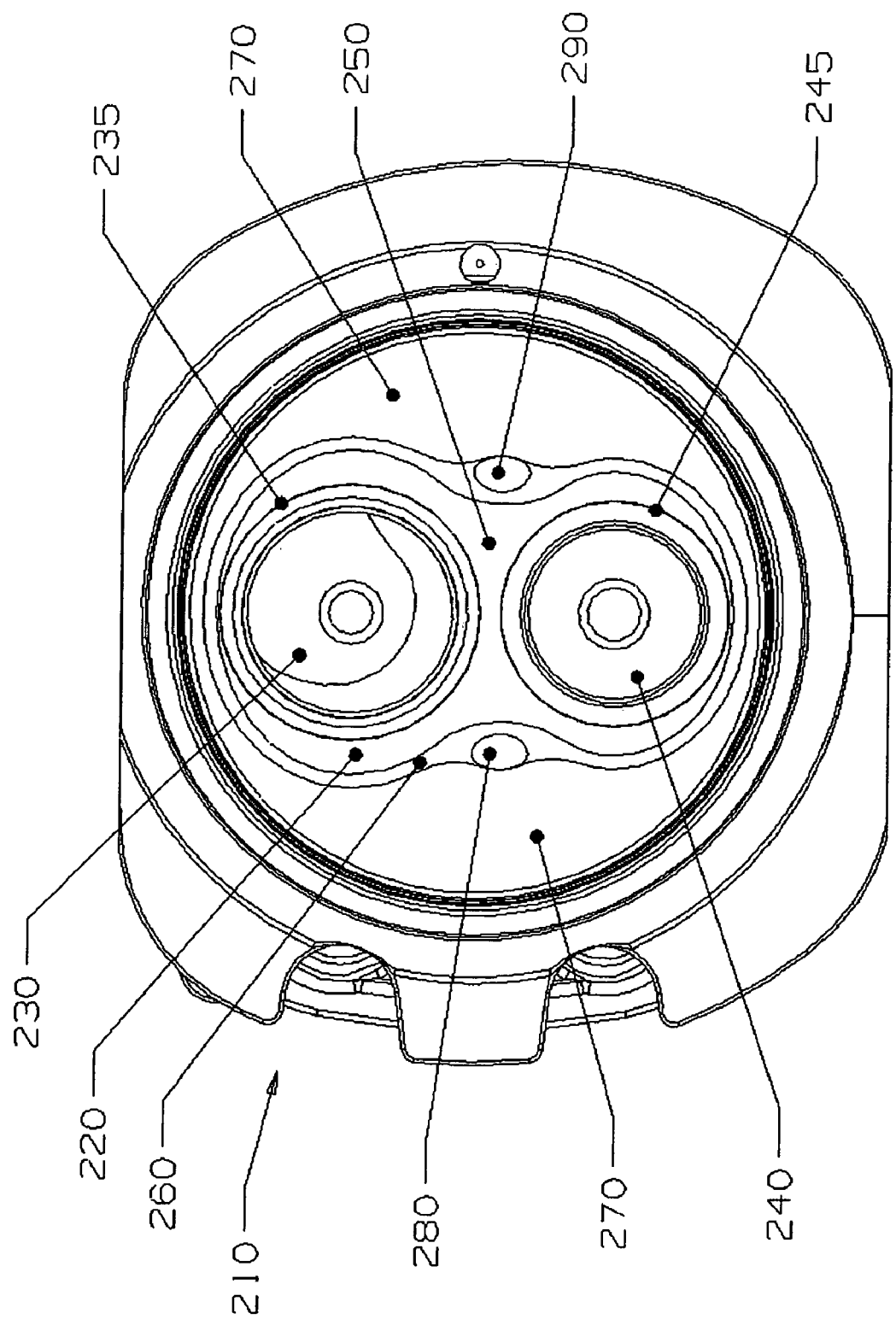
FIG. 2 is a combustion chamber according to an embodiment of the present invention.

One feature of the improved cylinder head assembly is an improved squish area. Referring to FIG. 2, a combustion chamber of a cylinder head 210 is shown. A valve region 220 is formed, e.g., milled, from a substantially flat surface 270 of a cylinder head 210. Valve region 220 comprises an intake valve 230 and an exhaust valve 240, centered within intake valve seat 235 and exhaust valve seat 245, respectively. A connecting region 250 may be formed, e.g., machined, between intake valve 230 and exhaust valve 240 to form the "peanut" shape of valve region 220, a shape having two bulbous portions. An angled wall 260 extends around the perimeter of valve region 220 to the flat surface 270. Flat surface 270 outside of valve region 220 defines the squish area. Unlike conventional cylinder heads, squish area 270 substantially surrounds valve region 220 and substantially extends around the perimeter of cylinder head 210, with the exception of a clearance for improved airflow through intake valve 230 and exhaust valve 240. A piston entering the combustion chamber has a similarly shaped squish area.

Figure 3:
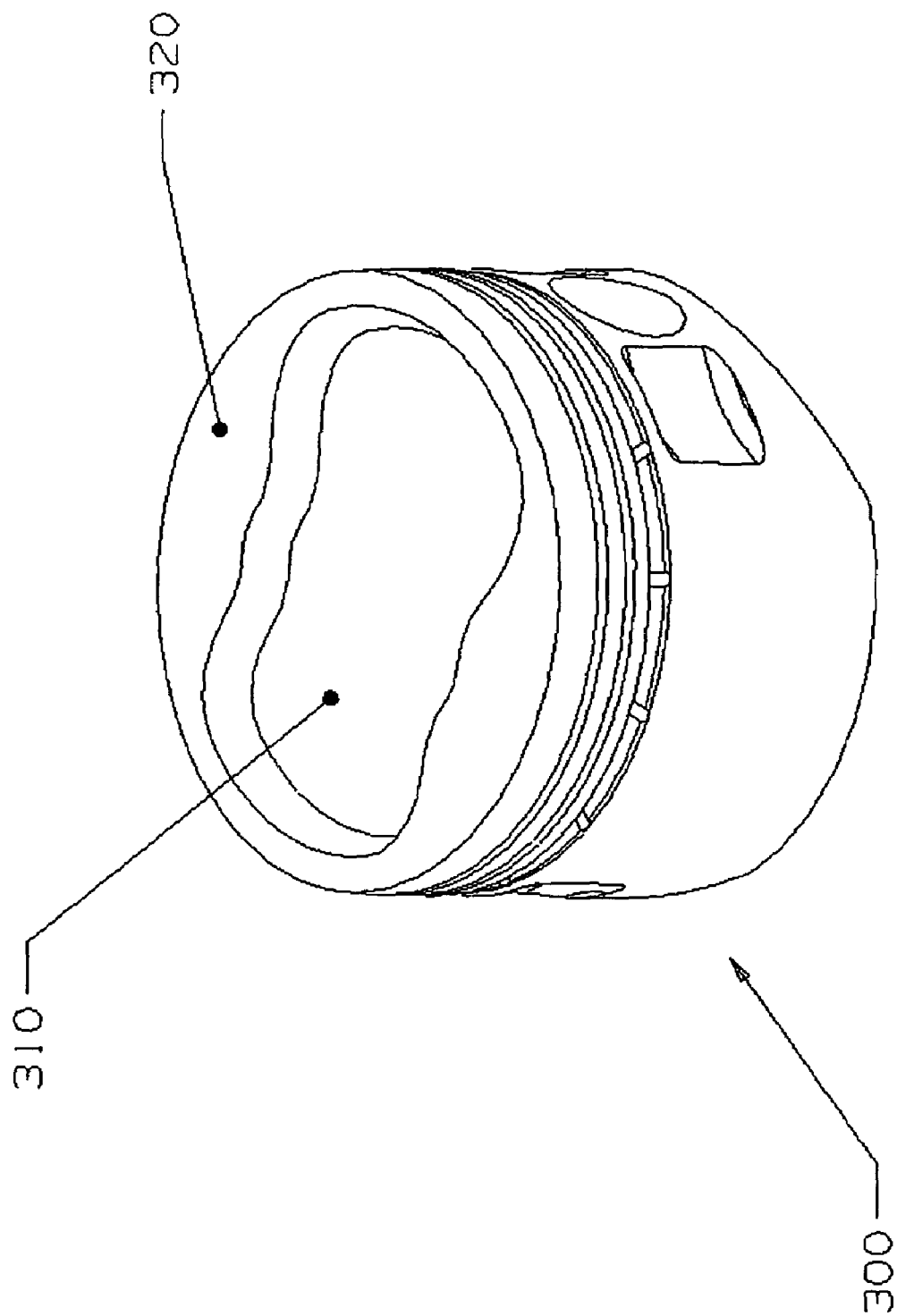
FIG. 3 is a piston crown according to an embodiment of the present invention.

Referring to FIG. 3, a piston crown 300 has a recessed region 310 in a flat surface 320 that substantially aligns with valve region 220 of cylinder head 210 of FIG. 2. Recessed region 310 may be formed by any suitable method, e.g., machining, and may have a "peanut" shape with first and second bulbous portions. The first and second, e.g., larger and smaller, bulbous portions of recessed region 310 may correspond to the larger and smaller bulbous portions of valve region 220 of FIG. 2. Flat surface 320 outside of the recessed region 310 defines the squish area. In order to maximize the squish, the flat squish area 320 surrounds recessed region 310 and extends around the perimeter of piston crown 300.

The maximized squish area allows for more efficient burning of the fuel/air mixture. The fuel/air mixture, confined by the walls of the combustion chamber, is forced into a relatively small area, causing turbulence. As a result, the fuel and oxygen are mixed more efficiently. Additionally, the added turbulence enables the flame to spread more uniformly and faster.

Ignition, i.e., spark, timing may be selected as desired. Because embodiments of the present invention allow the air/fuel mixture to burn faster, the spark plugs do not need to provide sparks as early in the engine cycle compared to the prior art. In an exemplary embodiment, the ignition timing is retarded to 20 degrees before top dead center or later.

The resulting performance approaches the ideal volume/pressure cycle. As the flame travels faster and burns the fuel/air mixture, the work cycle in a spark-ignited internal combustion engine incorporating the present invention more closely resembles an ideal Otto cycle. The similarity to the ideal cycle indicates high efficiency and results in a higher fuel economy.

Spark Plug Locations

In another feature of the cylinder head assembly, two spark plugs are positioned on opposing sides of the valve region such that the distance from the most distant extent of the combustion chamber to a spark plug tip is minimized. Referring to FIG. 2, first and second spark plug holes 280, 290 are shown in wall 260 for the insertion of the tips of spark plugs (not shown) so that the spark plugs are most proximate the corresponding valve. The first spark plug hole 280 is adjacent to intake valve 230. The second spark plug hole 290 is adjacent to exhaust valve 240. The first and second spark plug holes 280, 290 may be located at opposite sides of the waist 250 of the combustion chamber valve region 220. For example, the first and second spark plug holes 280, 290 may be located diagonally across the waist 250, as shown. The spark plugs may be also angled within the cylinder head assembly, as shown, though this is a flexible design parameter.

Referring to FIG. 4, a side view of a cylinder head 400 is shown. A spark plug is positioned at recess 410 and is directed to an intake valve. Referring to FIG. 4a, a cross-sectional view of cylinder head 400 through line A-A, recess 410 is shown such that the spark plug is directed at an intake valve 420.

Figure 5:
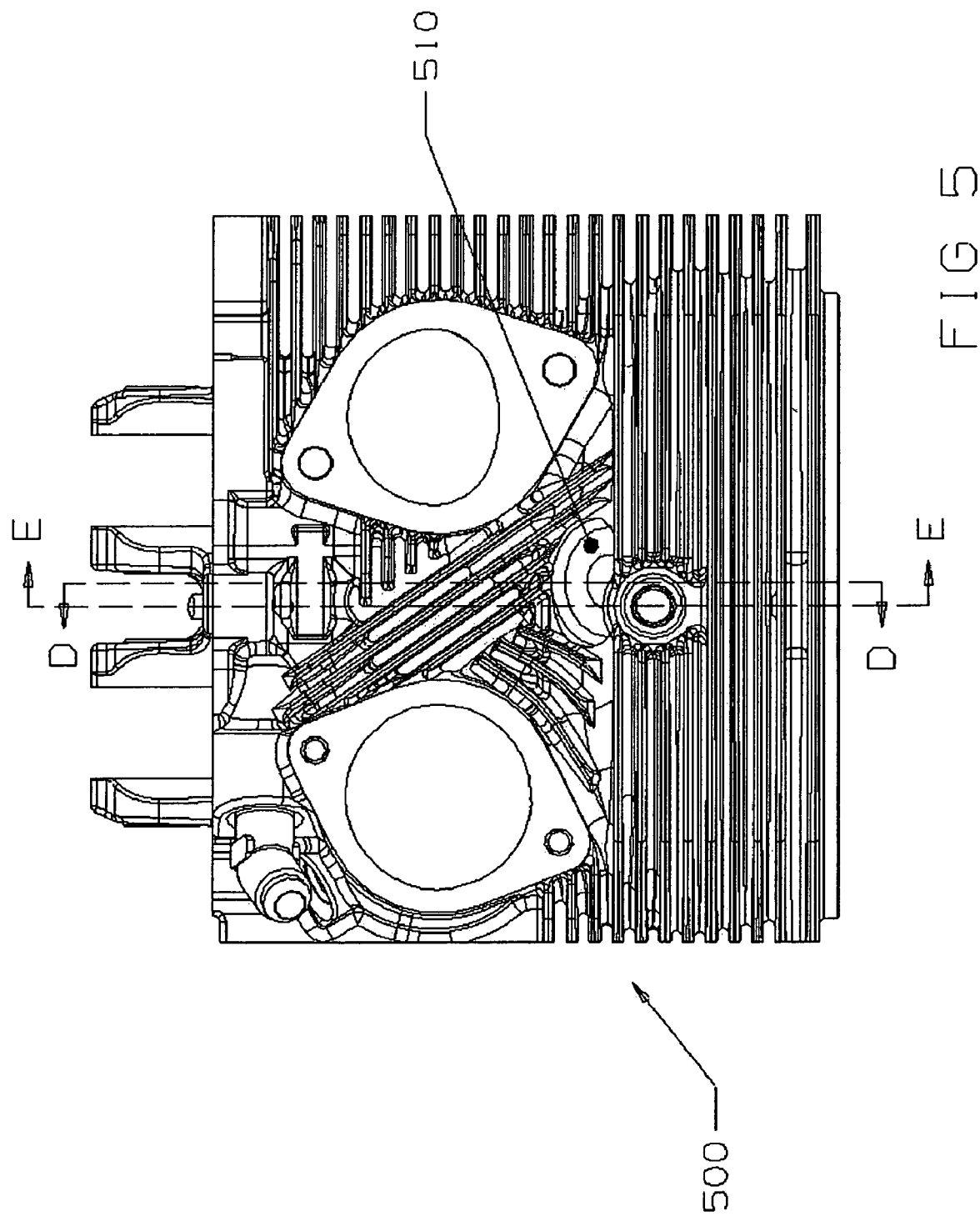
FIG. 5 is a side view of a cylinder head according to an embodiment of the present invention.

The second spark plug is positioned on the opposing side of the cylinder head. Referring to FIG. 5, an opposing side view of a cylinder head 500 is shown. A spark plug is positioned at recess 510 and is directed to an exhaust valve. Referring to FIG. 5a, a cross-sectional view of cylinder head 500 through line D-D, recess 510 is shown such that the spark plug is directed at an exhaust valve 520.

Airflow in Ports

A desirable configuration for a cylinder head assembly according to the present invention has improved airflow for the intake and exhaust of the combustion chamber. In certain embodiments, the valve heads are lowered within the cylinder head, e.g., approximately one quarter inch, below the location of valve heads in a conventional cylinder head. As a result, the port flow radius is increased. When the valves open, turbulence near the valves, produced as the gases flow against the wall of the combustion chamber, may be minimized. The turbulence is undesirable as it reduces the mass flow rate through that valve and causes back pressure to build.

Preferably, the compression ratio, i.e., the volume of the cylinder when the piston is at bottom dead center to the volume when the piston is at top dead center, is similar to the compression ratio used in conventional cylinder heads. In one aspect of the present invention, the compression ratio may be increased, while using the same fuels and maintaining the detonation margin. As a result, for an engine having an improved cylinder head according to the present invention, power output and fuel economy may be improved. In a second aspect of the present invention, lower octane fuels or unleaded fuels may be utilized while maintaining the compression ratio used in conventional or pre-existing cylinder heads. A third aspect of the present invention includes a compression ratio less than that used in conventional cylinder heads. Accordingly, the nominal power output of a pre-existing, e.g., FAA certified engine, may be maintained while permitting the use of much lower octane fuels such as unleaded automobile gasoline when used with a cylinder head assembly according to the present invention.

In certain embodiments, the squish area may also be lowered toward the piston crown, which will tend to extend the intake and exhaust port passages. The extension of the intake and exhaust port passages increases the minimum flow radius and minimizes flow losses resulting from abrupt changes in the gas flowpath. The more gradual flowpaths of the present invention improves the flow of the intake and exhaust gases and enhances efficiency and/or power output of the engine.

Figure 6:
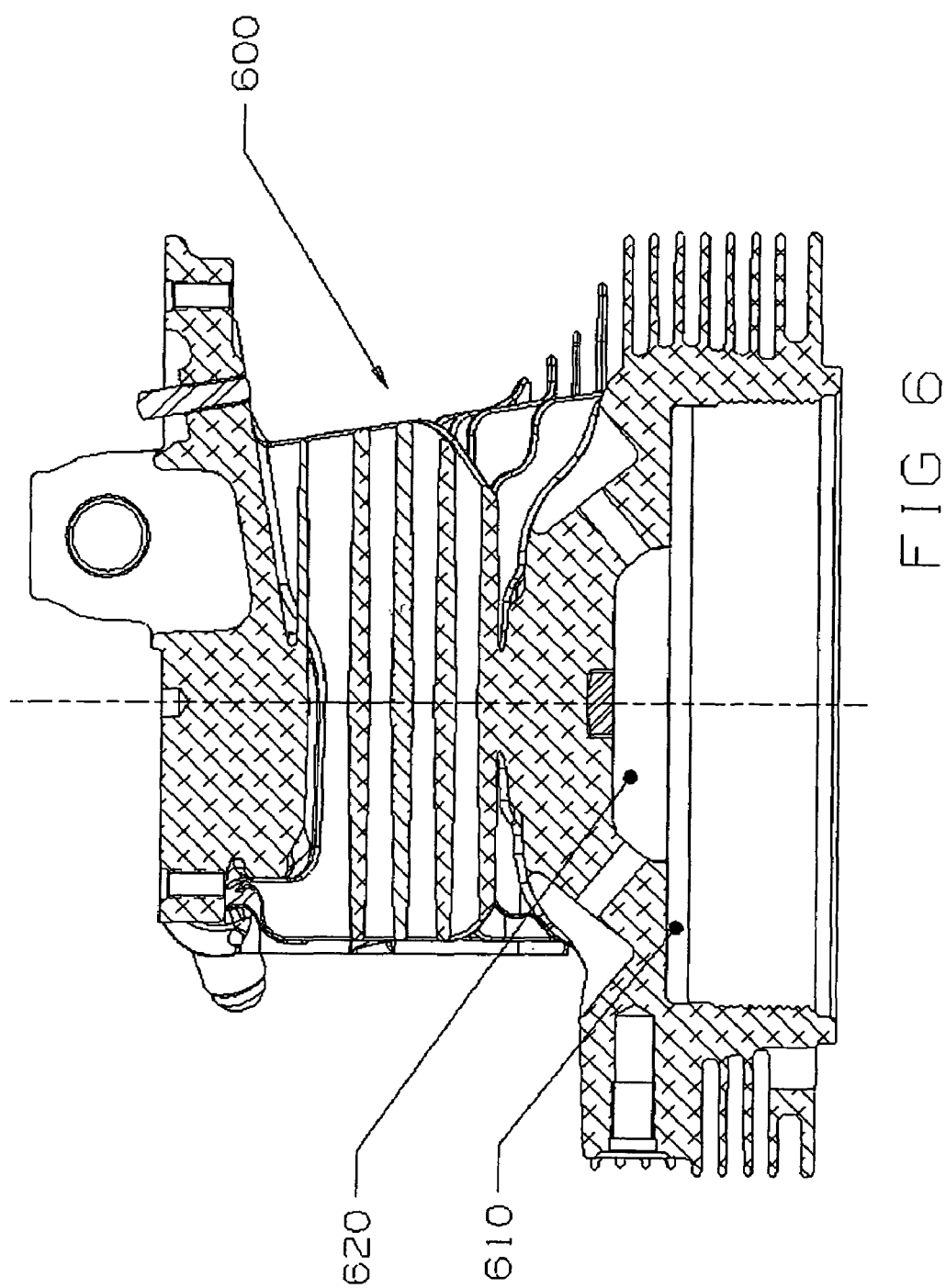
FIG. 6 is a cross sectional view of a cylinder head according to an embodiment of the present invention.
Figure 7:
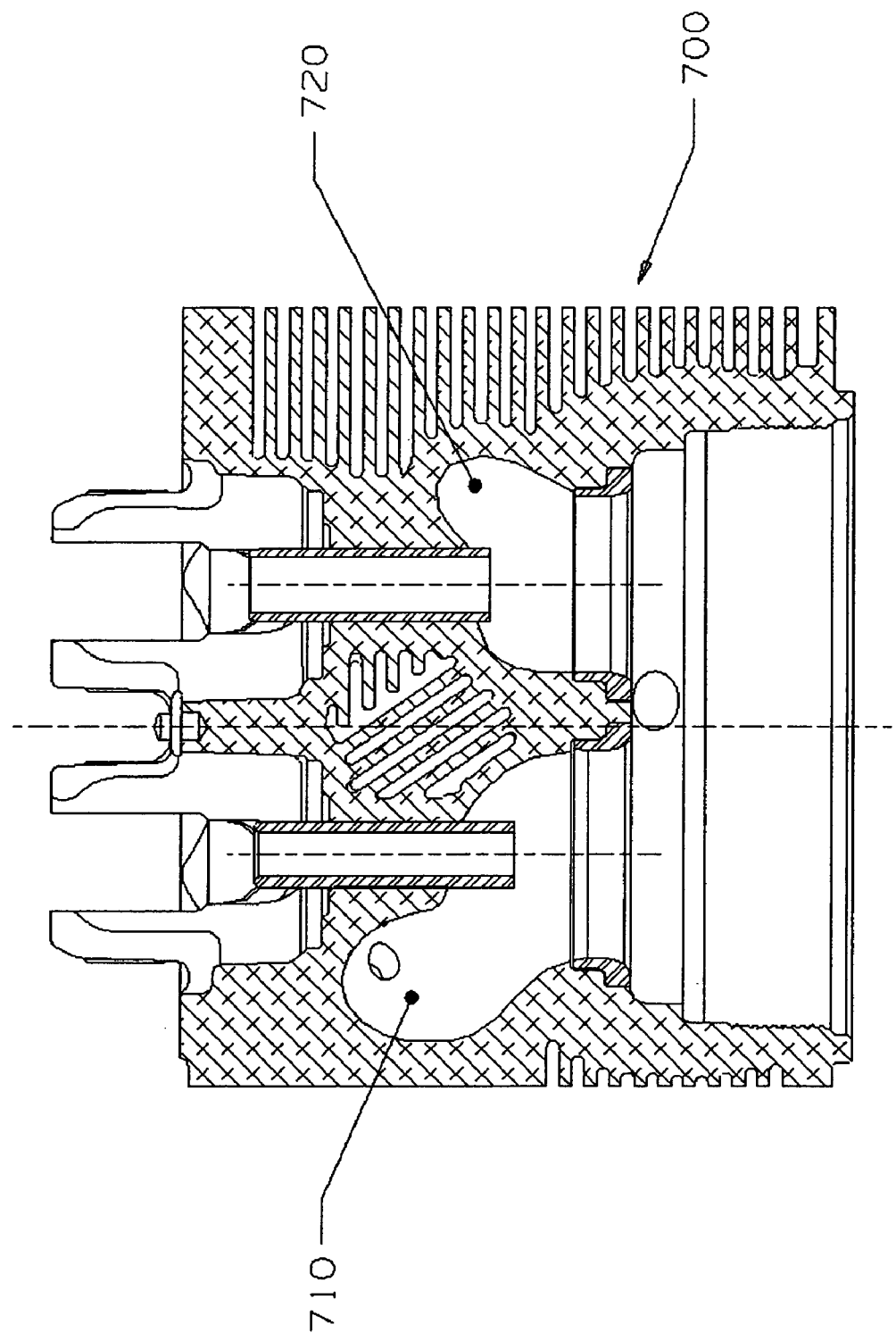
FIG. 7 is a cross sectional view of a cylinder head according to an embodiment of the present invention.

Referring to FIG. 6, a cross section of a cylinder head 600 is shown. A squish area 610 and a valve 620 is lowered within cylinder head 600, such that a top dead center distance (corresponding to the distance by which an upper surface of the piston crown (i.e., facing the cylinder head) is separated from the cylinder head when the piston is at top dead center) is reduced. Alternatively, in modifying an engine (such as an FAA certified engine), the cylinder head of the engine may actually be replaced with another cylinder head such that the piston crown is separated from the another cylinder head by a distance less than the top dead center distance. Referring to FIG. 7, a cross section of a cylinder head 700 is shown. Due to the lowered valve heads, an intake port passageway 710 and an exhaust port passageway 720 have an extended passageway with an increased minimum flow radius.

As a result of the incorporation one or more of the features of the present invention, an internal combustion engine experiences advantages including one or more of increased fuel efficiency, reduced fuel octane requirement, and horsepower. In one exemplary embodiment, the fuel efficiency and power improves by 5 to 10 percent as compared to a conventional cylinder head without the features of the present invention. In another exemplary embodiment, the fuel efficiency improves by about 2 percent and the horsepower improves by about 5 percent while the fuel octane requirement is reduced by 5 to 10 points on the motor octane scale.

The faster burn achieved with a high squish combustion chamber allows the spark timing to be retarded slightly and reduces the octane requirement of the fuel for a given compression ratio/power output. Alternatively, the compression ratio could be increased slightly to increase power output while maintaining the original detonation margin. Although the exemplary embodiment is directed to a parallel valve cylinder head with a 5.125" diameter bore, the port configurations and high squish technology of the present invention can be applied to any bore size, such as a larger cylinder head with a 5.318" diameter bore. Additionally, the present invention can also be readily applied to so-called "angle valve" cylinder heads with various port configurations, such as an up-exhaust with a down-intake or a down-exhaust with an up-intake.

In one embodiment of the present invention, the features are combined in a cylinder head assembly to be installed in an aircraft internal combustion engine. For example, these features are incorporated in a cylinder head by an original equipment manufacturer ("OEM") when providing a new internal combustion engine.

In an alternative embodiment, the features of the present invention are incorporated in an overhaul kit for a conventional aircraft engine. Engines operated in FAA certificated aircraft must be maintained in an airworthy condition using only replacement parts that meet the FAA approved type design. In the event that changes to these approved parts increase engine power output, engine weight, or other regulated features, FAA regulations require that the certificated aircraft design, in which the engine is installed, also undergo FAA design approval for the engine modifications. As a result, the cylinder head of the present invention is configured to maintain the regulated features while providing benefits in enhanced fuel economy and lower fuel octane requirement. For engines operated in aircraft that do not fall under FAA certification, such as Experimental Category aircraft, garage- or home-built aircraft, etc., the overhaul kit can provide all of the features incorporated in the previous embodiment for original equipment manufacturer engines.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A cylinder head and piston assembly, comprising:
   a cylinder head comprising:
      a recessed valve region comprising a first bulbous portion and a second bulbous portion interconnected by a narrower waist portion, wherein portions of a periphery of the recessed valve region at opposing sides the waist portion extend inwardly toward each other so as to form a substantially peanut-shaped recess that is symmetrical about an axis extending between centers of the first and second bulbous portions, the first bulbous portion accommodating an intake valve and the second bulbous portion accommodating an exhaust valve; and
   a piston comprising a recessed region that substantially conforms to the recessed valve region of the cylinder head.

2. The assembly of claim 1, further comprising a flat region on the cylinder head substantially surrounding the valve region, wherein the flat region includes an inner periphery surrounding the valve region having a substantially symmetrical peanut-shape.

* * * * *